(12) United States Patent
Kim et al.

(10) Patent No.: US 6,705,408 B2
(45) Date of Patent: *Mar. 16, 2004

(54) POWER TOOL WITH A LINEAR MOTOR

(75) Inventors: Houng Joong Kim, Hitachi (JP); Shigeru Shinohara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/985,235

(22) Filed: Nov. 2, 2001

(65) Prior Publication Data

US 2002/0053445 A1 May 9, 2002

(30) Foreign Application Priority Data

Nov. 6, 2000 (JP) ........................................ 2000-338181

(51) Int. Cl.[7] .............................................. B25D 13/00
(52) U.S. Cl. ...................................... 173/114; 318/135
(58) Field of Search .......................... 310/12, 47, 50; 318/135; 173/217, 114, 117, 2

(56) References Cited

U.S. PATENT DOCUMENTS

| 3,456,136 | A | | 7/1969 | Pierro et al. | |
|---|---|---|---|---|---|
| 4,562,385 | A | * | 12/1985 | Rabson | 310/14 |
| 4,583,027 | A | * | 4/1986 | Parker et al. | 310/15 |
| 4,653,360 | A | * | 3/1987 | Compton | 318/135 |
| 4,847,513 | A | | 7/1989 | Katz et al. | |
| RE33,910 | E | * | 5/1992 | Compton | 82/18 |
| 5,179,304 | A | * | 1/1993 | Kenjo et al. | 310/12 |
| 5,338,121 | A | * | 8/1994 | Kobayashi et al. | 101/93.04 |
| 5,598,044 | A | * | 1/1997 | Satomi et al. | 310/12 |
| 5,661,350 | A | | 8/1997 | Lucidarme et al. | |
| 5,723,917 | A | * | 3/1998 | Chitayat | 310/12 |
| 5,808,382 | A | * | 9/1998 | Ira et al. | 310/12 |
| 6,098,288 | A | * | 8/2000 | Miyagawa et al. | 30/210 |
| 6,181,090 | B1 | * | 1/2001 | Amaya et al. | 310/50 |
| 6,274,952 | B1 | * | 8/2001 | Chitayat | 310/12 |
| 6,548,920 | B2 | * | 4/2003 | Joong et al. | 310/12 |

FOREIGN PATENT DOCUMENTS

| JP | 58-45880 | 3/1983 |
|---|---|---|
| JP | 63-095849 | 4/1988 |
| JP | 63-107452 | 5/1988 |
| JP | 4-23272 | 2/1992 |
| JP | 04-023272 | 2/1992 |
| JP | 8-502880 | 3/1996 |
| JP | P3021500 | 1/2000 |
| JP | 2000-079460 | 3/2000 |
| JP | 2000-79460 | 11/2001 |

* cited by examiner

Primary Examiner—Rinaldi I. Rada
Assistant Examiner—Paul Durand
(74) Attorney, Agent, or Firm—Antonelli, Terry, Stout & Kraus, LLP

(57) ABSTRACT

A power tool has a linear motor which includes a movable element having a tool mounted on its one end and having magnotic poles installed at a fixed pitch along the direction of movement, magnetic pole teeth installed in opposition to each other and at a fixed pitch along the direction of movement in a longitudinal direction of the movable element, and a coil for exciting the magnetic pole teeth so that the adjacent magnetic pole teeth and opposed magnetic pole teeth act and different poles, respectively. The power tool further has a control circuit for reciprocating the movable element by exciting the coil, thereby to work on a workpiece by using the tool in the process of this reciprocating movement.

12 Claims, 8 Drawing Sheets

POWER TOOL WITH A LINEAR MOTOR

BACKGROUND OF THE INVENTION

The present invention relates to a power tool, particularly to a power tool for working by reciprocating a front tool such as a saw, a hammer, a chisel and scissors.

In a conventional power tool, the mechanism for converting the rotary motion of a motor rotator into the linear motion is adopted when cutting by the reciprocation operation. On the other hand, various types of linear motors are developed in the power tool with a linear motor. However, a lot of conventional linear motors have the structure which can be obtained by extending the rotating machine, and, as a result, obtain a straight line drive. For instance, the hammering device provided with a stator having a plurality of toroidal magnetic pole parts in a direction of the shaft line and an electromagnetic coil turned around a driving shaft is disclosed in the Japanese Patent Application Laid-Open No. 2000-79460.

In the mechanism for converting the rotary motion into the linear motion, it becomes a big trouble to cause a remarkable vibration and noise when working. On the other hand, the conventional linear motor has the structure which can be obtained by extending the rotating machine, and, as a result, obtains a straight line drive, as described above. Therefore, the motor efficiency is low because there is a lot of leakage flux between the movable element and the armature in the power tool with a linear motor. As a result, it is difficult to make practical in a power tool in which the high power is needed. In addition, the magnetic attraction power between the movable element and the armature works in one direction so that a big load may rest upon the support member of the movable element. As a result, the distortion is caused in the structure, various evils are caused, and it is, therefore, difficult to put into practical use.

SUMMARY OF THE INVENTION

An object of the present is to provide a power tool with a linear motor which can improve the motor efficiency and obtain the high power by reducing the leakage of the magnetic flux which passes between the armature and the movable element and reducing the magnetic attraction power produced between the armature and the movable element to cut out the mechanical section which is the source of the vibration and the noise in the power tool.

In a power tool with a linear motor according to one aspect the present invention, the linear motor comprises: a movable element installing a front tool at its one end and having magnetic poles installed at a fixed pitch along the direction of the movement; magnetic pole teeth installed in opposition to each other and at a fixed pitch along the direction of the movement in the vertical direction of movable element; and a coil for exciting the magnetic pole teeth so that the adjacent magnetic pole teeth and opposed magnetic pole teeth may becomes different poles, respectively. The linear motor further comprises a control circuit for reciprocating said movable element by exciting said coil to work something by using the front tool in the process of this reciprocating movement.

In a power tool with a linear motor according to another aspect the present invention, the linear motor has an armature formed with magnetic substance, a coil turned around the armature, and a movable element which can be relatively moved according to the action on the magnetic field produced by the armature. The linear motor has one row of the magnetic pole teeth connected magnetically to one magnetic poles of the armature and arranged with dividing into a first stage and a second stage in a direction substantially vertical to the direction where the movable element is moved, and the other row of the magnetic pole teeth connected magnetically to the other magnetic poles of the armature and arranged with dividing into a first stage and a second stage in a direction substantially vertical to the direction where the movable element is moved. The magnetic pole teeth of the first stage of the one row of the magnetic pole teeth and the magnetic pole teeth of the first stage of the other row of the magnetic pole teeth are alternately arranged in the direction where the movable element is moved, and the magnetic pole teeth of the second stage of the one row of the magnetic pole teeth and the magnetic pole teeth of the second stage of the other row of the magnetic pole teeth are alternately arranged in the direction where the movable element is moved. Further, the movable element is arranged between both rows of the magnetic pole teeth of the first stage and both rows of the magnetic pole teeth of the second stage.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DETAILED DESCRIPTION OF THE PREFERRED EMBODIMENTS

Figure 1:
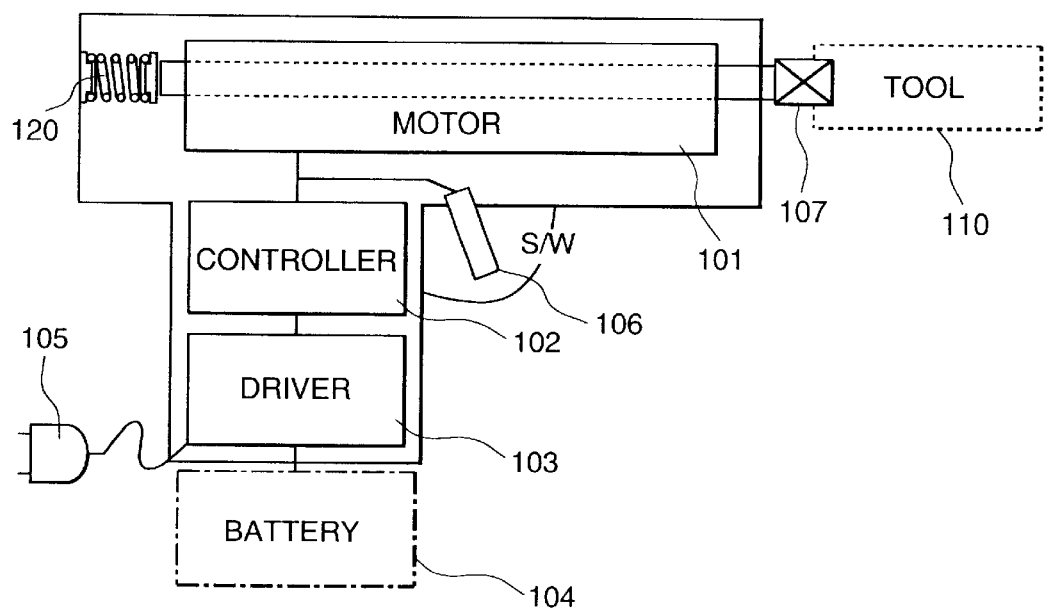
FIG. 1 is a block diagram showing the basic configuration of the power tool with a linear motor according to one embodiment of the present invention.

The present invention will be discussed hereinafter in detail in terms of the preferred embodiment of a vehicular travel control system according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Embodiments of the present invention will be explained hereinafter with reference to the drawings. In the drawings, like numerals designate like components.

FIG. 1 shows a block diagram of the basic configuration of a power tool with a linear motor. In FIG. 1, reference numeral 101 designates a linear motor composed of the armature and the movable element described later. 102 a controller, 103 a driver, 104 a battery, 105 a power cord, 106 a switch, 107 a uniting part, and 110 a front tool installed at one end of the movable element through uniting part 107. A power supply for said power tool is provided with a switching mechanism (not shown) for changing over the battery and the external energizer. Further, battery 104 and power cord 105 can be detached if necessary. As a bumper, spring 120 is installed at the other end of the movable element in which front tool 110 of said linear motor is not provided. In addition, the efficiency of the power tool is raised by using the resonance phenomena of spring 120 to allow movable element 6 to reciprocate.

Figure 16:
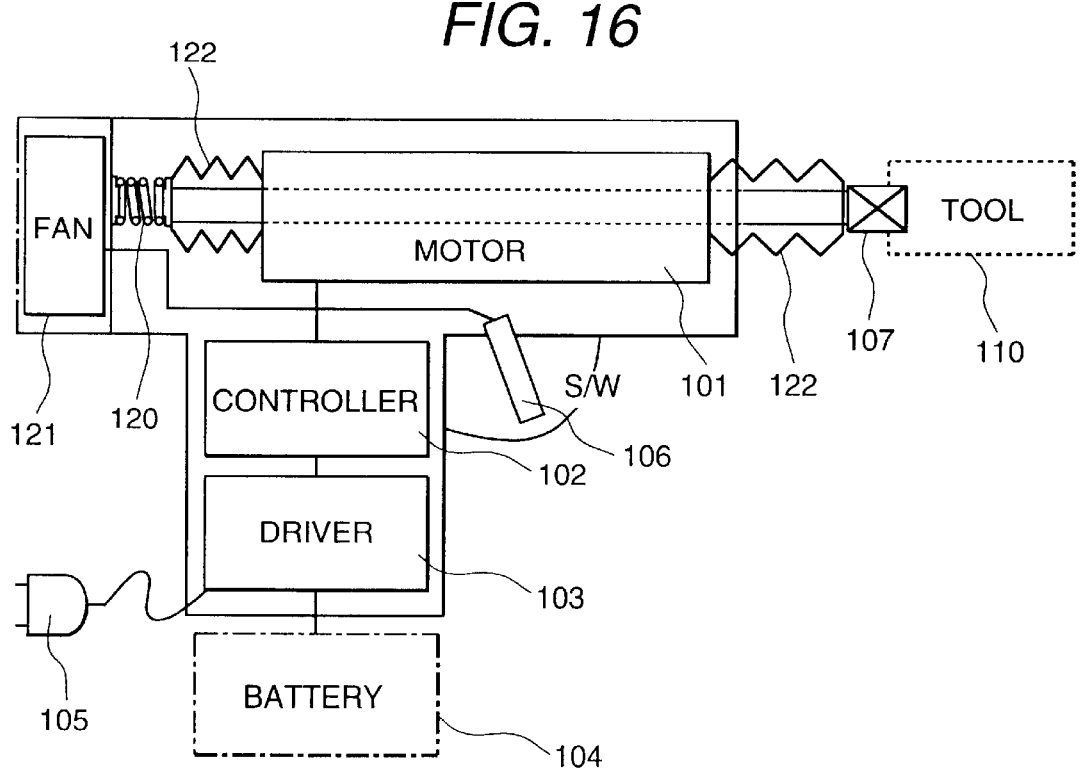
FIG. 16 is a block diagram showing the power tool with a linear motor according to another embodiment of the present invention.

FIG. 16 is a block diagram showing another embodiment of the present invention, in which cooling device 121 and dust proof mechanism 122 in addition to the basic configuration shown in FIG. 1 are installed. In FIG. 16, cooling device 121 is either an air-cooling device without a blower type device, which has the cooling pin etc. on the surface of linear motor 101 or a forced-air-cooled type device with the electric motor. To prevent chips, iron powder, foreign particle, and dust, etc. from sticking to said linear motor, dust proof mechanism 122 is installed in the reciprocating moving range of movable element 6.

Figure 2A:
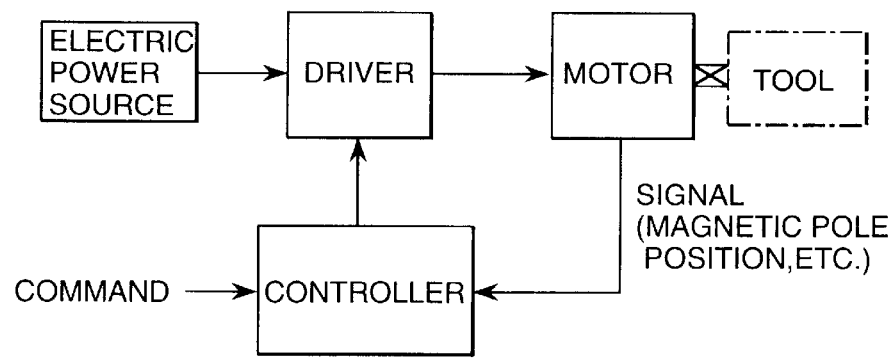
FIGS. 2(a) and 2(b) are control block diagrams in one embodiment of the present invention.
Figure 2B:
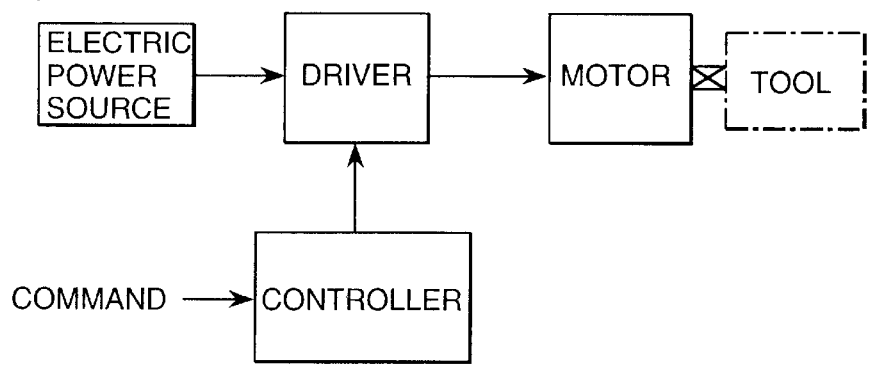

FIGS. 2 and 3 show control block diagrams of the power tool with a linear motor according to this embodiment. FIG. 2(a) shows a closed-loop control system composed of the linear motor, a sensor for detecting the magnetic pole position and the relative displacement of the armature and the movable element of the linear motor, a controller for feeding back an output signal of the sensor, and a power drive part. FIG. 2(b) shows an open-loop control system composed of the linear motor, a controller, and a power drive part.

Figure 3A:
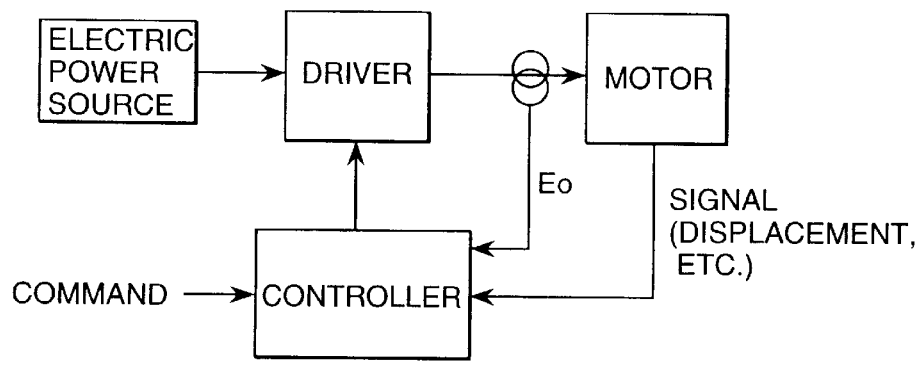
FIGS. 3(a) and 3(b) are control block diagrams in another embodiment of the present invention.

FIG. 3(a) shows a magnetic pole sensor-less control system composed of the linear motor, a voltage sensor, the controller, and the power drive part. In this embodiment, the induced voltage produced by the linear motor is read to the controller by using the voltage sensor. The controller estimates the position of the magnetic pole from the magnitude of the induced voltage, and outputs the signal for driving the linear motor to the power drive part. In this control system, the linear motor can be stably driven because it is not necessary to provide the magnetic pole position sensor in the linear motor.

Figure 3B:
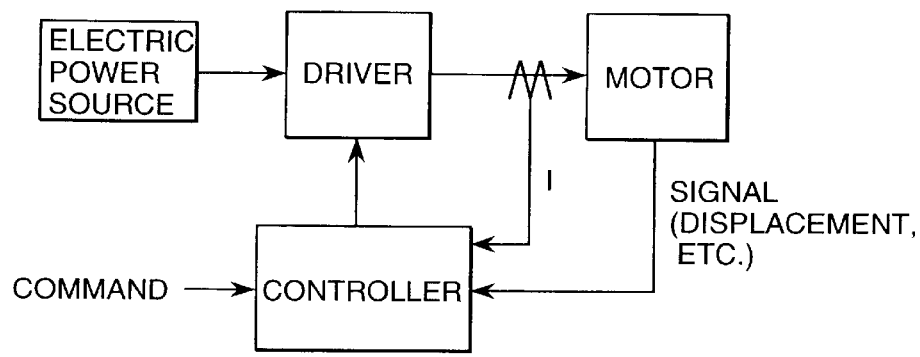

FIG. 3(b) shows a magnetic pole sensor-less control system composed of the linear motor, a current sensor, the controller, and the power drive part. In this embodiment, the electric current which flows to the linear motor is read to the controller by using the current sensor. The controller calculates the induced voltage by the linear motor from the voltage applied to the linear motor and the current value detected, and estimates the position of the magnetic pole. In this control system, the linear motor can be stably driven because it is not necessary to provide the magnetic pole position sensor in the linear motor.

Figure 4:
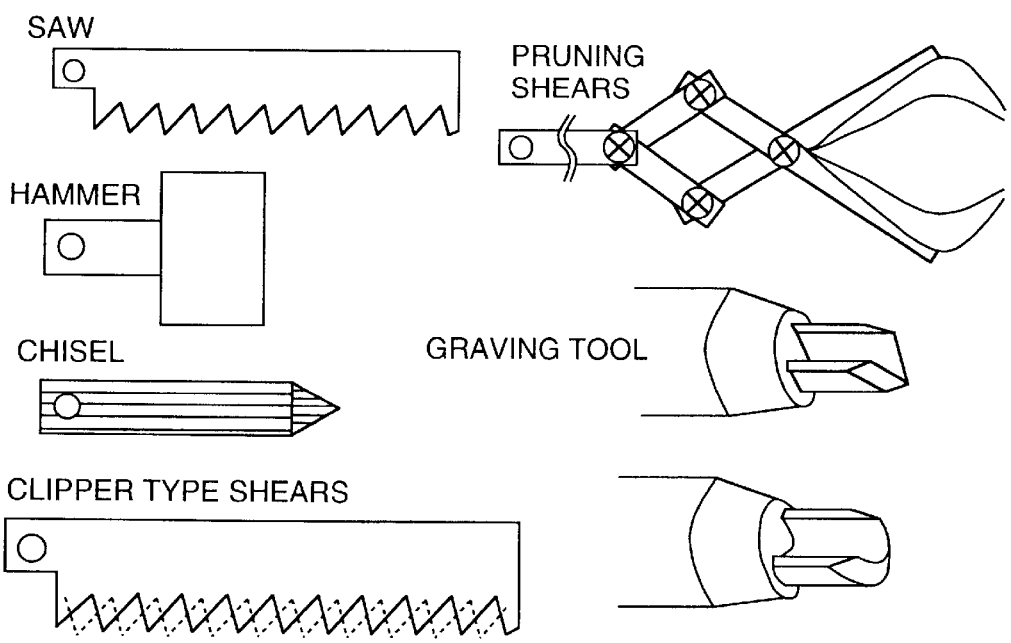
FIG. 4 is front tools used in the present invention.

FIG. 4 shows many kinds of front tools used in the present invention. Although a saw, a hammer, a chisel, clipper type shears, a pruning shears and graving tools are shown in FIG. 4, it is needless to say that if it is possible to work by the reciprocating linear motion, other tools can be used.

Figure 5A:
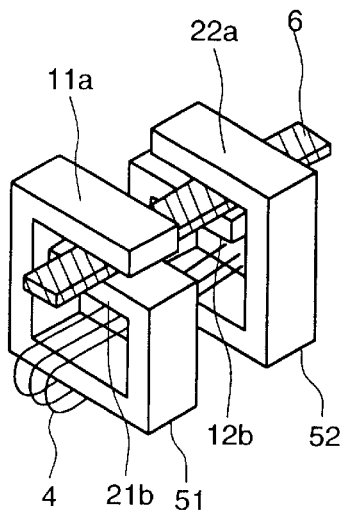
FIGS. 5(a) and 5(b) are schematic views of the linear motor used for the power tool of the present invention.
Figure 5B:
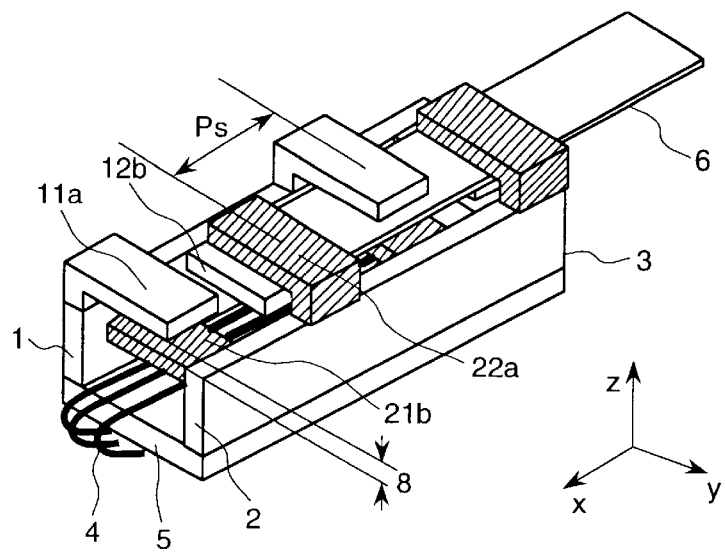

FIGS. 5(a) and 5(b) show schematically the linear motor used for the power tool of the present invention. FIG. 5(a) shows the basic configuration of the linear motor according to one embodiment of the present invention, and FIG. 5(b) shows schematically one example of the linear motor with multi-poles.

In FIG. 5(a), reference numeral 51 designates a core having a first opposed portion, and 52 a core having a second opposed portion. An upper magnetic pole and a lower magnetic pole are alternately arranged in each of cores 51 and 52. Where, an upper magnetic pole teeth 11a and a lower magnetic pole teeth 21b of core 51 are defined as the first opposed portion, and a lower magnetic pole teeth 12b and an upper magnetic pole teeth 22a of core 52 are defined as the second opposed portion. The armature is composed so that the (2n−1)th cores may form the first opposed portion and the (2n)th cores may form the second opposed portion (n=1, 2, 3, . . . ). Further, one coil 4 is turned around the cores 51 and 52 as shown in FIG. 5(a).

Movable element 6 is supported in the first opposed portion of core 51 and in the second opposed portion of core 52, and it is movable relative to the armature. As seen in FIG. 5(b), the armature comprises the magnetic poles 1 and 2, iron core 5 and the coil 4, and the movable element comprises a permanent magnet, non-magnetic substance, and magnetic substance. Further, constant gap 8, as seen in FIG. 5(b), is formed between the upper magnetic pole teeth and the lower magnetic pole teeth of each of the opposed portions. When the movable element is inserted into the gap 8, the movable element is supported in the opposed portions of the first and second opposed portions. The magnetic flux alternately flows between the upper magnetic pole teeth and the lower magnetic pole teeth in the gap of each opposed portion of the linear motor, and the movable element moves relatively through the gap.

Figure 6A:
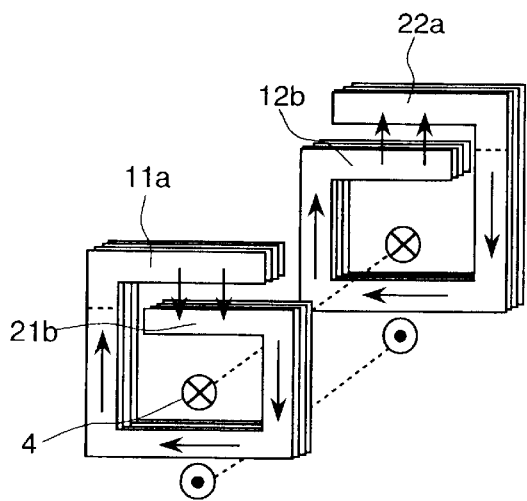
FIG. 6(a) is a conceptual diagram showing the flow of the magnetic flux in the linear motor.
Figure 6B:
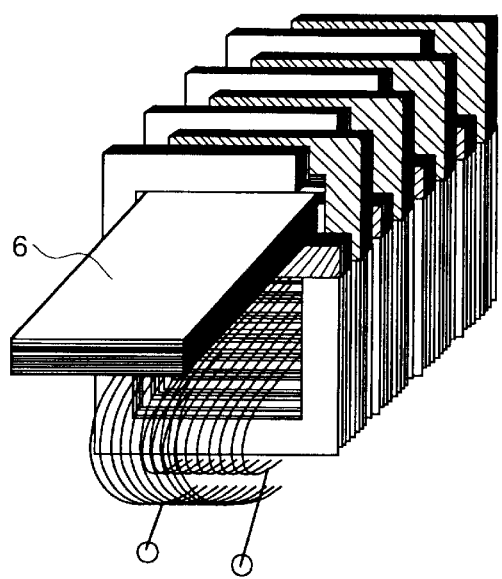
FIG. 6(b) is a schematic view showing the assembly structure of the linear motor in which the laminated steel plates are used.

FIG. 6(a) is a conceptual diagram showing the flow of the magnetic flux in the linear motor, and FIG. 6(b) is a schematic view showing the assembly structure of the linear motor in which the laminated steel plates are used.

In the above-mentioned configuration, the magnetic flux alternately flows between the upper magnetic pole teeth (11a,22a) and the lower magnetic pole teeth (21b,12b) in the gap of the opposed portion of the linear motor as shown in FIG. 6(a), and the movable element 6 moves relatively to the armature 3 through the gap.

Further, because the magnitude of the attraction acting on the movable element 6 and the upper magnetic pole teeth (11a, 22a) is almost the same as that acting on the movable element 6 and the lower magnetic pole teeth (21b,12b) in the linear motor of this embodiment, and the direction where the attraction acts on is opposite to each other, the entire attraction becomes small. Therefore, the attraction between the movable element 6 and the magnetic pole teeth of the armature 3 can be reduced, and the load of the support member can be decreased.

In FIG. 6(*b*), armature 3 is composed of the laminated steel plate. In this structure, the first opposed portion and the second opposed portion are alternately arranged in order in the direction of movement. Further, the core portion where coil 4 of armature 3 is turned around and the magnetic pole portions having the opposed portions between which movable element 6 is sandwiched are manufactured with the laminated steel plate as block construction.

Figure 7:
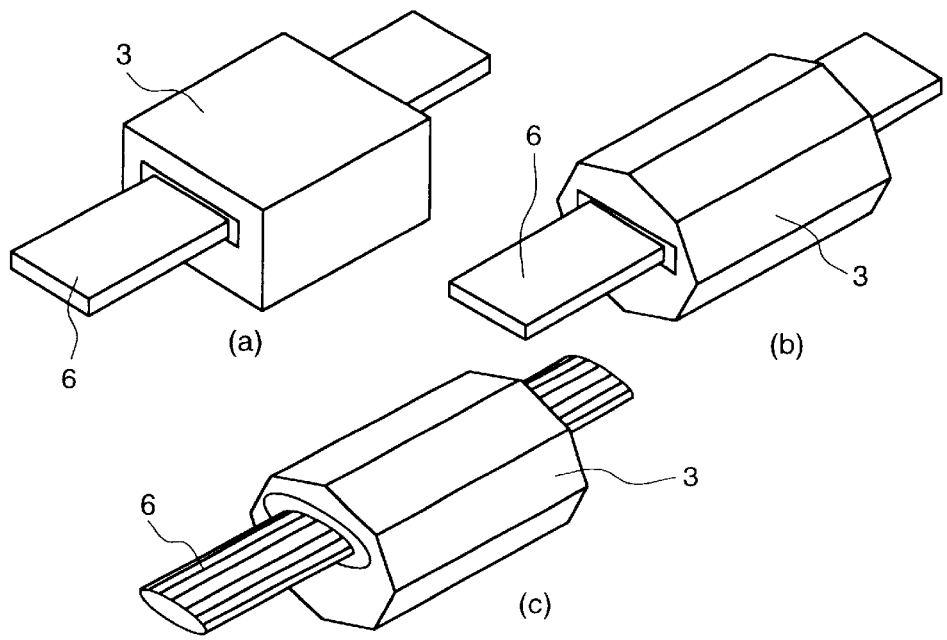
FIG. 7 is a perspective view showing schematically the configuration of the linear motor with a molded armature.
Figure 8:
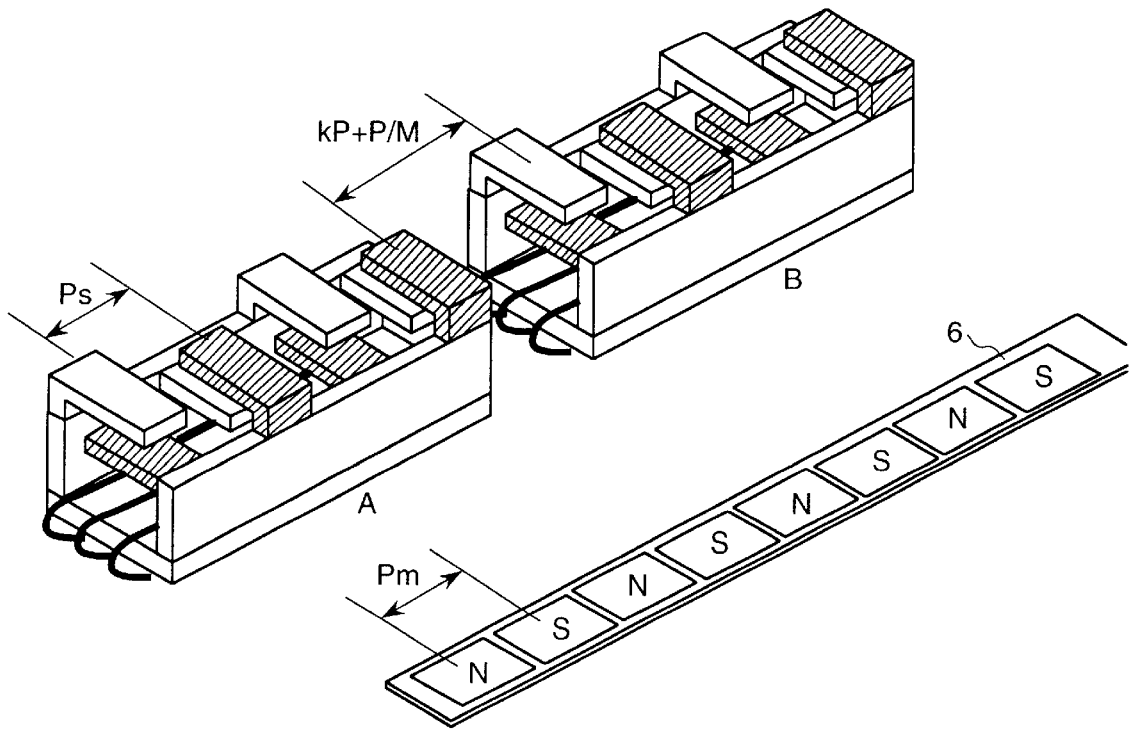
FIG. 8 is a diagrammatic illustration of two linear motors arranged in series.
Figure 9:
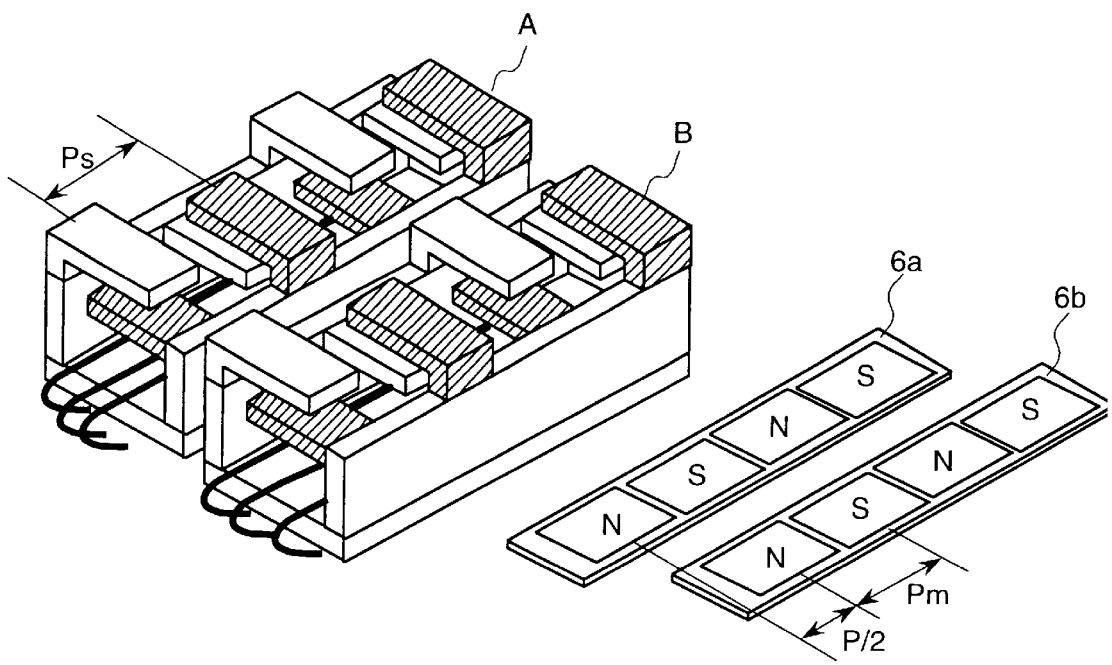
FIG. 9 is a diagrammatic illustration of two linear motors arranged in parallel.

FIGS. 7(*a*), 7(*b*) and 7(*c*) each shows the structure in which the armature composed of the laminated steel plate shown in FIG. 6(*b*) is molded. For armature 3, the laminated steel plate, the coil, and the support member (not shown) are molded together. Further, as shown in FIG. 8, A-phase and B-phase can be molded individually or all together by arranging the armature in series. As shown in FIG. 9, A-phase and B-phase can be molded individually or all together by arranging the armature in parallel.

Figure 11:
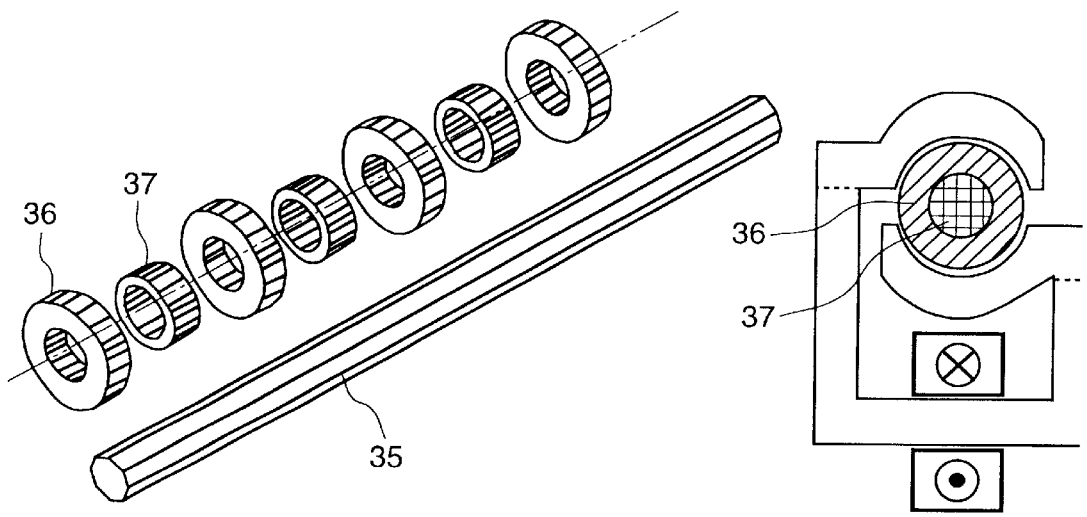
FIG. 11 is a view showing a further embodiment of the movable element.

Armature 3 can be in the rectangular lumber shape or the cylinder shape, etc. according to the shape of the power tool. Further, movable element 6 can also similarly take the rectangular lumber shape or the cylinder shape as shown in FIG. 11, etc.

Figure 13:
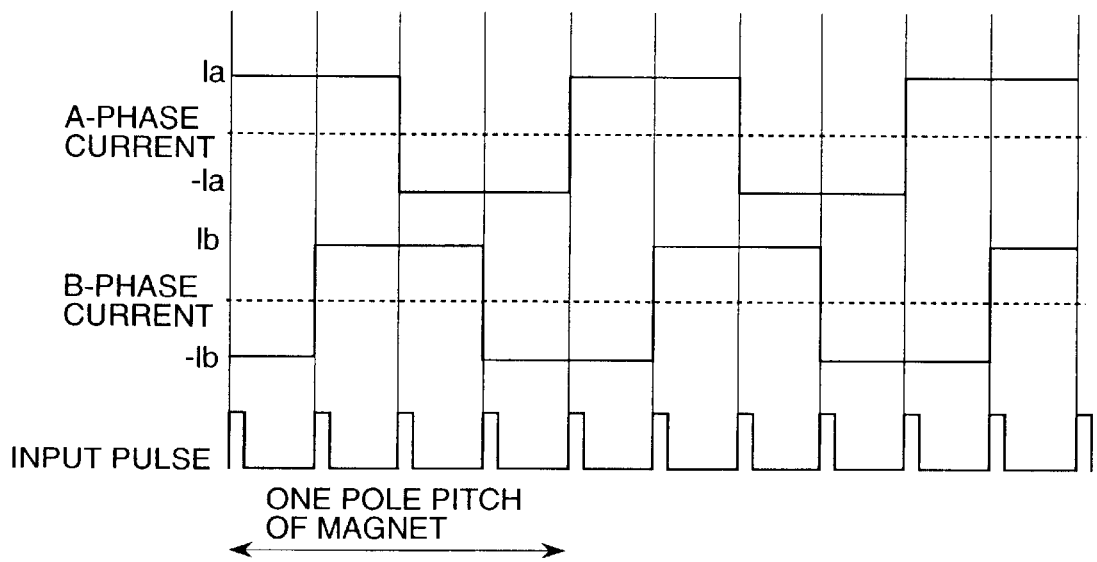
FIG. 13 is a timing chart showing an excitation sequence in a two-phase linear motor.

FIG. 8 shows the arrangement of a linear motor of this embodiment. In FIG. 8, two armatures 3 are arranged in series. Movable element 6 moves relatively by giving the phase difference of 90° in the electrical angle between A-phase and B-phase, and generating the traveling magnetic field due to the change-over of the excitation. The excitation sequence of a two-phase linear motor is shown in FIG. 13. The movement amount and the movement speed in the forward and reverse travels are set depending on the condition suitable for front tool 110 and the material to be worked. They are the same as that of a conventional power tool. Further, switch 106 shown in FIG. 1 has a function of changing the movement amount and the movement speed in the forward and reverse travels.

Figure 14:
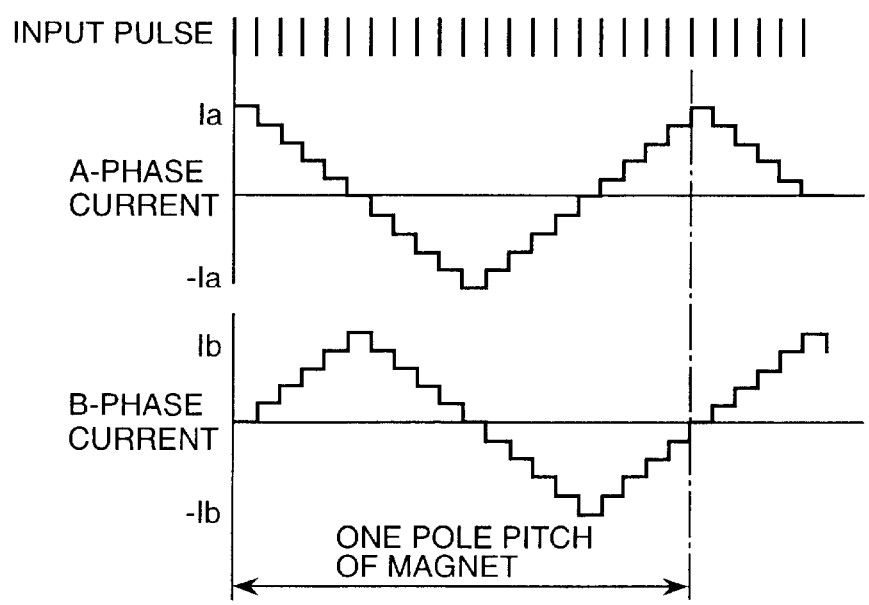
FIG. 14 is a timing chart showing another excitation sequence in a two-phase linear motor.
Figure 15:
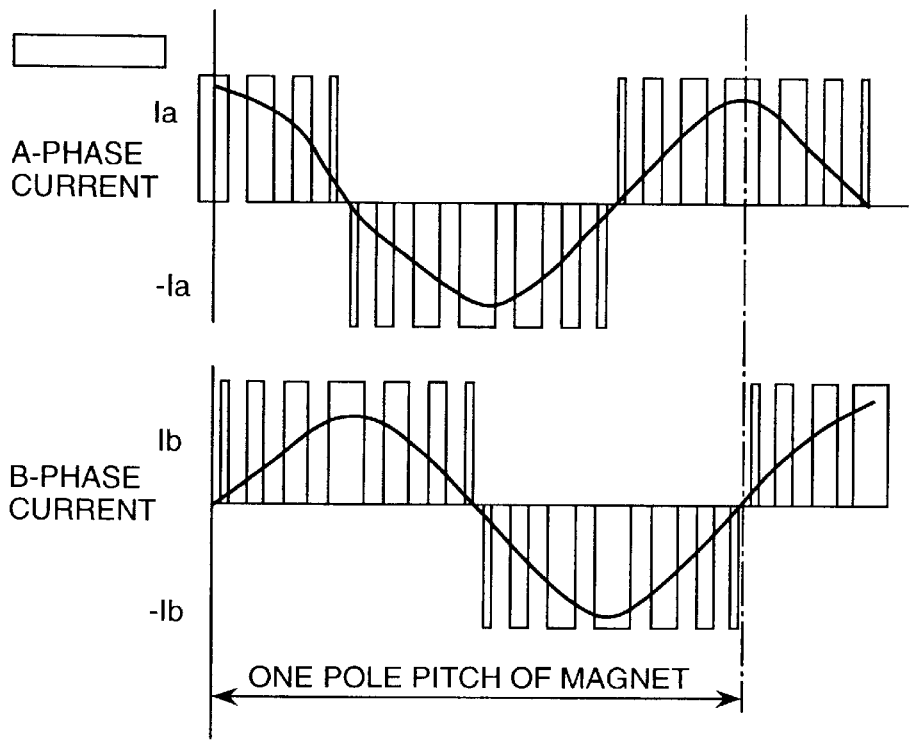
FIG. 15 is a timing chart showing a further excitation sequence in a two-phase linear motor.

FIGS. 14 and 15 show other excitation sequences of a two-phase linear motor. FIG. 14 illustrates the method of allowing the step angle of the motor to be a finer angle by controlling the motor electric current to a pseudosine wave current. The noise and the vibration are decreased according to this method. In the method illustrated in FIG. 15, the frequency control and the output voltage control is performed at the same time in the inverter part. The output voltage waveform is pulse-duration-modulated (PWM), and is made a sinusoid. As a result, Low-order higher harmonic can be removed, and the thrust ripple of the motor can be decreased. Therefore, the noise and the vibration are decreased according to this method.

FIG. 9(*a*) shows another arrangement of the linear motor. In FIG. 9(*a*), two armatures 3 and two movable elements 6*a* and 6*b*, as shown in FIG. 9(*b*), are arranged in parallel. A plurality of movable elements can be integrated by arranging a plurality of armatures 3 in parallel.

Although the above embodiments has been described in connection with a one-phase or two-phase linear motor, poly-phase linear motors such as a three-phase, four-phase, and five-phase, etc. can be used in a similar way.

When a plurality of armatures are arranged, and the pole pitch is assumed to be P, the pitch between adjacent magnetic pole teeth of the armature 3 is (k·P+P/M), k=0, 1, 2 . . . ; M=2, 3, and 4 . . . , k being the number which can be freely chosen within the range which adjacent armatures 3 can be arranged, and M being the number of phase of the motor.

Figure 10:
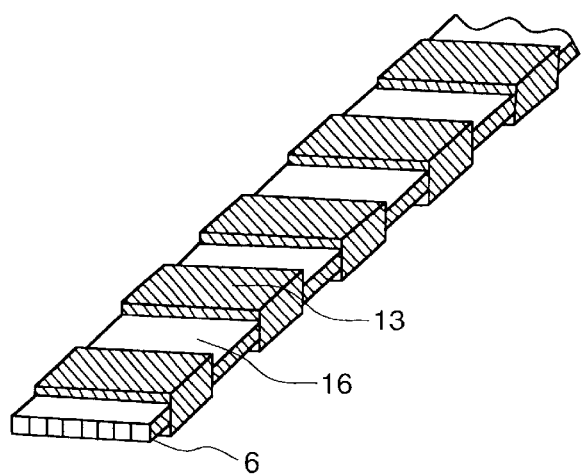
FIG. 10 is a view showing another embodiment of the movable element.

FIG. 10 shows a plate movable element used in the embodiment of the present invention. FIG. 11 shows a cylinder type movable element used in the embodiment of the present invention. In FIG. 10, the magnetic resistance between the magnetic poles of the opposed portions of the armature changes in a traveling direction when convex magnetic pole teeth 13 are provided on both surfaces of plate type ferromagnetic substance. That is, the magnetic resistance between the convex magnetic pole teeth 13 and the magnetic pole of the opposed portion of armature 3 is smaller than that between plate part 16 of ferromagnetic substance and the magnetic pole of the opposed portion of armature 3. By using the change in the magnetic resistance, freely movable element 6 can be obtained. It is also possible to obtain a composite type movable element by adopting ferromagnetic substance for convex magnetic pole teeth 13, and providing a permanent magnet in plate part 16. Further, it is possible to adopt the ferromagnetic substance for convex magnetic pole teeth 13, and adopt the non-magnetic substance for plate part 16.

In FIG. 11, the principle of operation is the same as the explanation of FIG. 10. In the structure of FIG. 11, ferromagnetic substance 36 and non-magnetic substance 37 are alternately provided to axle 35. Further, a permanent magnet can be used.

Figure 12:
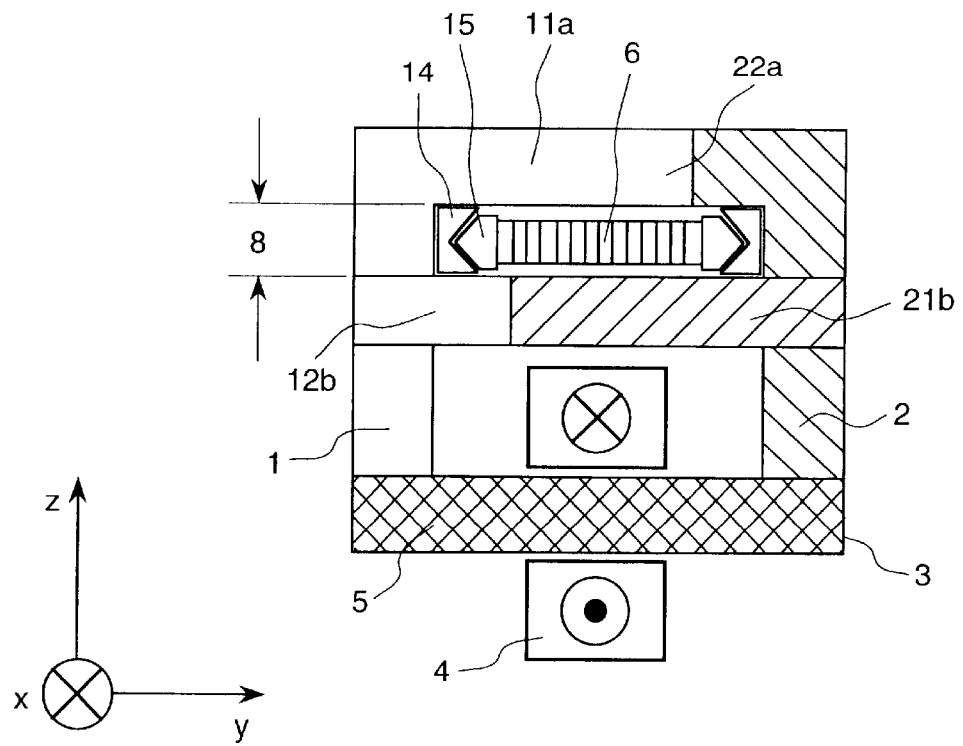
FIG. 12 is a sectional view of the linear motor according to one embodiment of the present invention.

FIG. 12 shows the sectional view of the linear motor according to the embodiment of the present invention. In FIG. 12, support member 14 is arranged on the armature side (3), and support member 15 is arranged on the movable element side (6). These support members act to support movable element 6. As a result, movable element 6 is supported by support members 14 and 15, and moves through gap 8 or passes the so-called gap tunnel.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A power tool with a linear motor:
    wherein said linear motor comprising;
        a movable element installing a front tool at its one end;
        an iron core connected with a first magnetic pole and a second magnetic pole;
        upper magnetic pole teeth and lower magnetic pole teeth; and
        a coil for exciting the magnetic pole teeth;
    further comprising a control circuit;
        wherein said upper magnetic pole teeth connected with said first magnetic pole and said upper magnetic pole teeth connected with said second magnetic pole are alternately arranged in one direction from said movable element, and
        said lower magnetic pole teeth connected with said second magnetic pole and said lower magnetic pole teeth connected with said first magnetic pole are arranged in an other direction from said movable element.

2. The power tool with a linear motor according to claim 1, wherein said control circuit is a closed-loop control system composed of said linear motor, a sensor for detecting magnetic pole position and relative displacement of an armature and the movable element of said linear motor, a controller for feeding back an output signal of the sensor, and a power drive part.

3. The power tool with a linear motor according to claim 1, wherein said control circuit is an open-loop control system composed of said linear motor, a controller, and a power drive part.

4. The power tool with a linear motor according to claim 2, wherein said controller includes a means for detecting a voltage induced by said linear motor and estimating a relative position of magnetic poles of said armature and said movable element based on the voltage detection value.

5. The power tool with a linear motor according to claim 2, wherein said controller includes a means for detecting a current flowing through said linear motor and estimating a relative position of magnetic poles of said armature and said movable element based on the current detection value.

6. The power tool with a linear motor according to any one of claims 1 to 3, wherein when a plurality of armatures are arranged, and the pole pitch is P, the pitch between adjacent magnetic pole teeth of the armature 3 is $(k \cdot P + P/M)$, $k = 0, 1, 2 \ldots$; $M = 2, 3$, and $4$, $k$ being the number which can be freely chosen within the range which adjacent armatures 3 can be arranged, and M being the number of phase of the motor.

7. The power tool with a linear motor according to any one of claims 1 to 3, further comprising a uniting part where many kinds of front tools are exchanged is provided at the end of movable element of said linear motor.

8. The power tool with a linear motor according to any one of claims 1 to 3, further comprising a dust proof mechanism provided in the reciprocating moving range of the movable element of said linear motor.

9. The power tool with a linear motor according to any one of claims 1 to 3, further comprising a cooling device for cooling the power tool.

10. The power tool with a linear motor according to any one of claims 1 to 3, further comprising a switching mechanism for changing over a battery and an external energizer available as a power supply for said power tool.

11. The power tool with a linear motor according to any one of claims 1 to 3, wherein a spring is provided at an other end of said movable element.

12. The power tool with a linear motor according to claim 1, wherein said linear motor has an armature formed with magnetic substance, a coil turned around the armature, and a movable element which can be relatively moved according to the action on the magnetic field produced by the armature, wherein said linear motor has one row of a magnetic pole teeth array connected magnetically to one magnetic pole of the armature and arranged with dividing into a first stage and a second stage in a direction substantially vertical to the direction where the movable element is moved, and an other row of the magnetic pole teeth array connected magnetically to an other magnetic pole of the armature and arranged with dividing into a first stage and a second stage in a direction substantially vertical to the direction where the movable element is moved, wherein the magnetic pole teeth of the first stage of the one row of the magnetic pole teeth array and the magnetic pole teeth of the first stage of the other row of the magnetic pole teeth array are alternately arranged in the direction where the movable element is moved, and the magnetic pole teeth of the second stage of the one row of the magnetic pole teeth array and the magnetic pole teeth of the second stage of the other row of the magnetic pole teeth array are alternately arranged in the direction where the movable element is moved, and wherein said movable element is arranged between both rows of the magnetic pole teeth arrays of the first stage and both rows of the magnetic pole teeth arrays of the second stage.

\* \* \* \* \*